(12) United States Patent
Sarkar et al.

(10) Patent No.: US 10,983,530 B2
(45) Date of Patent: Apr. 20, 2021

(54) METHOD AND SYSTEM FOR DETERMINING AN ACCURATE POSITION OF AN AUTONOMOUS VEHICLE

(71) Applicant: WIPRO LIMITED, Bangalore (IN)

(72) Inventors: Manas Sarkar, Barasat (IN); Balaji Sunil Kumar, Vaishali (IN)

(73) Assignee: Wipro Limited, Bangalore (IN)

(*) Notice: Subject to any disclaimer, the term of this patent is extended or adjusted under 35 U.S.C. 154(b) by 206 days.

(21) Appl. No.: 16/221,638

(22) Filed: Dec. 17, 2018

(65) Prior Publication Data
US 2020/0133301 A1   Apr. 30, 2020

(30) Foreign Application Priority Data
Oct. 31, 2018 (IN) .......................... IN201841041273

(51) Int. Cl.
*G05D 1/02* (2020.01)
*G01S 17/89* (2020.01)
*G05D 1/00* (2006.01)

(52) U.S. Cl.
CPC ............ *G05D 1/0274* (2013.01); *G01S 17/89* (2013.01); *G05D 1/027* (2013.01); *G05D 1/0278* (2013.01);
(Continued)

(58) Field of Classification Search
CPC .... G05D 1/0274; G05D 1/027; G05D 1/0278; G05D 1/0088; G05D 2201/0213; G01S 17/89
See application file for complete search history.

(56) References Cited

U.S. PATENT DOCUMENTS

| | | | | |
|---|---|---|---|---|
| 8,306,273 B1* | 11/2012 | Gravseth | ................. | G01S 17/89 382/106 |
| 9,576,185 B1* | 2/2017 | Delp | .................... | G05D 1/0242 |

(Continued)

OTHER PUBLICATIONS

Hosseinyalamdary et. al., "Tracking 3D Moving Objects Based on GPS/IMU Navigation Solution, Laser Scanner Point Cloud and GIS Data", published Jul. 31, 2015, all pages. (Year: 2015).*
(Continued)

*Primary Examiner* — Calvin Cheung
(74) *Attorney, Agent, or Firm* — Finnegan, Henderson, Farabow, Garrett & Dunner, LLP

(57) ABSTRACT

The present disclosure discloses method and an Electronic Control Unit (ECU) (101) of autonomous vehicle for determining an accurate position. The ECU (101) determines centroid coordinate from Global Positioning System (GPS) points, relative to autonomous vehicle and identifies approximate location and orientation of vehicle on pre-generated map based on centroid coordinate and Inertial Measurement Unit (IMU) data. Distance and direction of surrounding static infrastructure is identified from location and orientation of autonomous vehicle based on road boundaries analysis and data associated with objects adjacent to autonomous vehicle. A plurality of lidar reflection reference points are identified within distance and direction of static infrastructure based on heading direction of autonomous vehicle. Position of lidar reflection reference points are detected from iteratively selected shift positions from centroid coordinate. Thereafter, ECU (101) corrects initial position of autonomous vehicle by adding centroid coordinate with selected shift position to determine accurate position of autonomous vehicle.

14 Claims, 12 Drawing Sheets

(52) U.S. Cl.
CPC ... *G05D 1/0088* (2013.01); *G05D 2201/0213* (2013.01)

(56) References Cited

U.S. PATENT DOCUMENTS

| | | | |
|---|---|---|---|
| 2011/0282581 A1* | 11/2011 | Zeng | G01S 7/4808 |
| | | | 701/301 |
| 2017/0123421 A1* | 5/2017 | Kentley | B60W 30/00 |
| 2019/0049958 A1* | 2/2019 | Liu | G06N 3/02 |
| 2019/0180502 A1* | 6/2019 | Englard | G01S 7/417 |

OTHER PUBLICATIONS

Gollob, S., et al., "Localization of Acoustic Emissions in a Numerical T-Shaped Concrete Beam Using Multi-segment Path Analysis", Abstract, Springer Link (2017), pp. 1-4.

Liu, T., "Indoor Localization and Visualization Using a Human-Operated Backpack System", IEEE (2010), 10 pages.

\* cited by examiner

METHOD AND SYSTEM FOR DETERMINING AN ACCURATE POSITION OF AN AUTONOMOUS VEHICLE

TECHNICAL FIELD

The present subject matter is related in general to autonomous vehicles, more particularly, but not exclusively to a method and system for determining an accurate position of an autonomous vehicle.

BACKGROUND

In recent times, autonomous driving technology has grown rapidly for meeting requirement of safety and transportation efficiency. Autonomous vehicle system requires inputs from environment or physical world. Generally, an environment map is perceived by the autonomous vehicle system in multiple ways including, map data of the environment, three-dimensional data points of the environment using sensors for example, Lidar, location information through Global Positioning System (GPS)/Global Navigation Satellite System (GNSS), and the like. The autonomous vehicle system requires information about current position and orientation of autonomous vehicle with respect to the environment map. Specifically, for movement of the autonomous vehicle, the autonomous vehicle system may require current vehicle location or position and orientation in the environment map to generate a route and motion plan.

The autonomous vehicle system requires a map in correlation with its environment for autonomous navigation. While the map covers a wide span of area, the autonomous vehicle system must be informed about physical position of the autonomous vehicle on the environment and represent current position of the autonomous vehicle in the map. This process is called as initial position localization of the autonomous vehicle. Currently, to know the initial position, the autonomous vehicle depends primarily on location service provided by GPS or GNSS receivers, mounted on the autonomous vehicle. The GPS or GNSS receivers may generally reach an accuracy of estimated position nearly 7.8 meters, 95 percentage of the time. In addition, a Real Time Kinematic (RTK) correction signal technique is required to achieve centimetre level accuracy. Usually, signal condition in urban environment is strongly degraded due to poor sky view, building obstructions, multi-path reflections and the like. Thus, the position of the autonomous vehicle identified may not be at an acceptable level most of the time.

Also, other methods for example, landmark based localization are utilized, where multiple known landmarks are marked in the map and is observed to calculate the position of the autonomous vehicle. But this method also requires a lot of pre-arrangement of landmarks in the environment of navigation. Also, this pre-arrangement of landmarks at known positions is not possible at all instances along path to find initial position of the autonomous vehicle.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for determining an accurate position of an autonomous vehicle. The method comprises determining a centroid coordinate from a plurality of Global Positioning System (GPS) points, relative to the autonomous vehicle, at stationary position for a predefined time, identifying an approximate location and orientation of the vehicle on a pre-generated map based on the centroid coordinate and Inertial Measurement Unit (IMU) data of the autonomous vehicle. The method comprises identifying art approximate distance and direction of surrounding static infrastructure from the approximate location and orientation of the autonomous vehicle, based on an analysis of road boundaries in the pre-generated map and data associated with objects adjacent to the autonomous vehicle. Further, the method comprises identifying a plurality of lidar reflection reference points within the approximate distance and direction of the static infrastructure, based on heading direction of the autonomous vehicle. The plurality of lidar reflection reference points are marked and joined with a reference centre of the autonomous vehicle on an imaginary two-dimensional map. The method comprises detecting position of the plurality of lidar reflection reference points from iteratively selected shift positions, at the approximate distance and direction from the centroid coordinate on the pre-generated map within a predefined range and direction. Thereafter, correcting initial position of the autonomous vehicle by adding the centroid coordinate with one of the selected shift positions to determine the accurate position of the autonomous vehicle.

In an embodiment, the present disclosure may relate to an Electronic Control Unit (ECU) of an autonomous vehicle for determining an accurate position of the autonomous vehicle. The ECU may comprise a processor and a memory communicatively coupled to the processor, where the memory stores processor executable instructions, which, on execution, may cause the ECU to determine a centroid coordinate from a plurality of Global Positioning System (GPS) points, relative to the autonomous vehicle, at stationary position for a predefined time, identify an approximate location and orientation of the vehicle on a pre-generated map based on the centroid coordinate and Inertial Measurement Unit (IMU) data of the autonomous vehicle. The ECU identifies an approximate distance and direction of surrounding static infrastructure from the approximate location and orientation of the autonomous vehicle based on an analysis of road boundaries in the pre-generated map and data associated with objects adjacent to the autonomous vehicle. Further, the ECU identities a plurality of lidar reflection reference points within the approximate distance and direction of the static infrastructure, based on heading direction of the autonomous vehicle. The plurality of lidar reflection reference points are marked and joined with a reference centre of the autonomous vehicle on an imaginary two-dimensional map. The ECU detects position of the plurality of lidar reflection reference points from iteratively selected shift positions, at the approximate distance and direction from the centroid coordinate on the pre-generated map within a predefined range and direction. Thereafter, the ECU corrects initial position of the autonomous vehicle by adding the centroid coordinate with one of the selected shift positions to determine the accurate position of the autonomous vehicle.

In an embodiment, the present disclosure relates to a non-transitory computer readable medium including instructions stored thereon that when processed by at least one processor may cause an Electronic Control unit (ECU) of an autonomous system to determine a centroid coordinate from a plurality of Global Positioning System (GPS) points, relative to the autonomous vehicle, at stationary position for a predefined time, identify an approximate location and orientation of the vehicle on a pre-generated map based on the centroid coordinate and Inertial Measurement Unit (IMU) data of the autonomous vehicle. The instruction causes the processor to identify an approximate distance and direction of surrounding static infrastructure from the approximate location and orientation of the autonomous vehicle based on an analysis of road boundaries in the pre-generated map and data associated with objects adjacent to the autonomous vehicle. Further, the instruction causes the processor to identify a plurality of lidar reflection reference points within the approximate distance and direction of the static infrastructure, based on heading direction of the autonomous vehicle. The plurality of lidar reflection reference points are marked and joined with a reference centre of the autonomous vehicle on an imaginary two-dimensional map. The instruction causes the processor to detect position of the plurality of lidar reflection reference points from iteratively selected shift positions, at the approximate distance and direction from the centroid coordinate on the pre-generated map within a predefined range and direction. Thereafter, the instruction causes the processor to correct initial position of the autonomous vehicle by adding the centroid coordinate with one of the selected shift positions to determine the accurate position of the autonomous vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
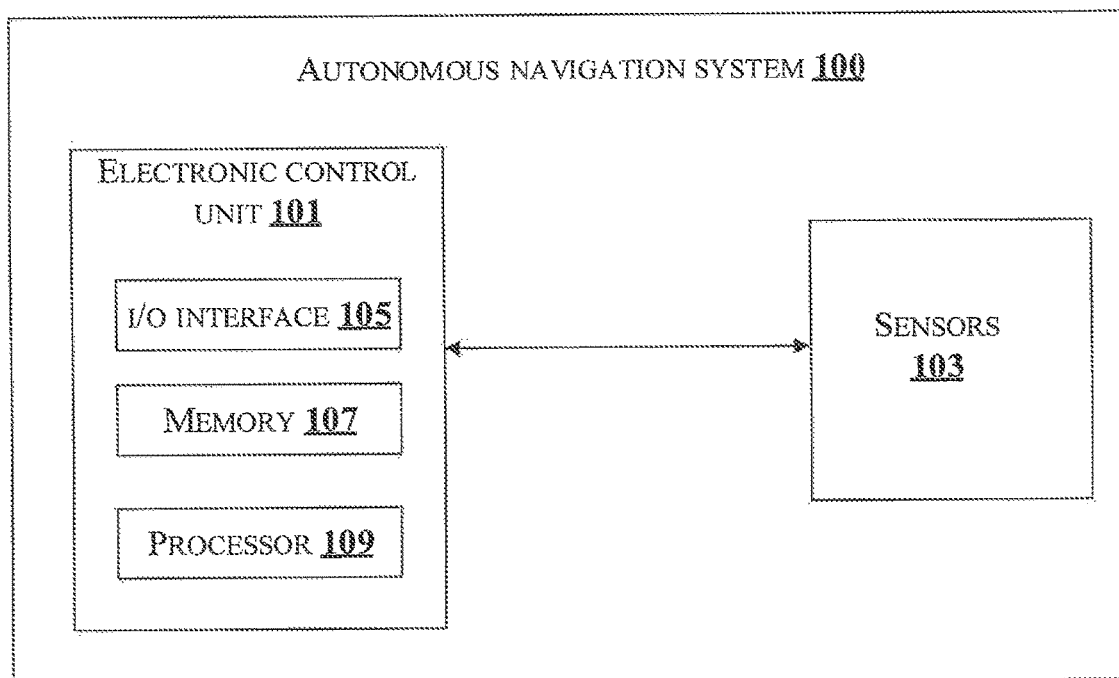
FIG. 1 illustrates an exemplary block diagram of an autonomous navigation system for determining an accurate position of an autonomous vehicle, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and an Electronic Control Unit (ECU) of an autonomous vehicle for determining an accurate position of the autonomous vehicle. In an embodiment, the autonomous vehicle refers to a driverless vehicle. The present disclosure utilizes existing available environment/infrastructure along a pre-generated map to determine accurate position of the autonomous vehicle. GPS sensor and vehicle on-board Lidar/laser sensors may be utilized for determining initial position of the autonomous vehicle in the environment. In an embodiment, initial position of the autonomous vehicle may be identified after the autonomous vehicle is powered on. In an embodiment, the autonomous vehicle may be set to autonomous navigation mode after determining the initial position. Multiple GPS points are collected, and a centroid of GPS points is identified. Based on environment understanding from the pre-generated map as well using the centroid and Inertial Measurement Unit (IMU) data, multiple lidar reflection points are chosen as reference points. A lidar reference shape in relation with centre of the autonomous vehicle centre is formed by combining the lidar reference points. The determined centroid of the GPS position may be shifted and moved iteratively until the centre of the autonomous vehicle is reached, by comparing with lidar reflective reference points. Thereafter, the accurate position is determined by adding the selected shift position with the centroid of the GPS position. The present disclosure determines accurate initial position of autonomous vehicle without any pre-arrangement of environment.

FIG. 1 illustrates an exemplary block diagram of an autonomous navigation system for determining an accurate position of an autonomous vehicle, in accordance with some embodiments of the present disclosure.

As shown in FIG. 1, the autonomous navigation system 100 includes an Electronic Control Unit (ECU) 101 and sensors 103. A person skilled in the art would understand that the autonomous navigation system 100 may also include any other units, not mentioned explicitly in the present disclosure. The ECU 101 may be used for determining an initial accurate position of the autonomous vehicle. In an embodiment, the sensors 103 may include, a Light Ranging and Detection (LIDAR) system. A person skilled in the art would understand that the sensors 103 may include any other remote sensing sensor, not mentioned explicitly in the present disclosure. In an embodiment, a standalone system (not shown in FIG. 1) may receive data from the sensors 103 of the autonomous vehicle and determine the initial accurate position of the autonomous vehicle. At any instant of time when the autonomous vehicle is powered on and is at a stationary position, the ECU 101 of the autonomous vehicle may determine a centroid coordinate of the position of the autonomous vehicle, from a plurality of Global Positioning System (GPS) points, relative to the autonomous vehicle. The plurality of GPS points may be received over a period from a GPS sensor of the autonomous vehicle. For example, on powering on the autonomous vehicle, six GPS points are received at a time period of 30 seconds, one at each five seconds. The ECU 101 obtains data from Inertial Measurement Unit (IMU) sensor of the autonomous vehicle and identifies an approximate location and orientation of the autonomous vehicle on a pre-generated map based on the determined centroid coordinate. In an embodiment, the pre-generated map is a two-dimensional environment map which correlates surrounding static infrastructure and covers a wide span of area around the autonomous vehicle.

Further, the ECU 101 may identify an approximate distance and direction of the surrounding static infrastructure from the approximate location and orientation of the autonomous vehicle. The approximate distance and direction may be identified by analysing road boundaries in the pre-generated map and data associated with objects adjacent to the autonomous vehicle. In an embodiment, analysing the road boundaries comprises tracing the road boundaries on the pre-generated map in frontal direction of the autonomous vehicle. The ECU 101 further identifies a plurality of lidar reflection reference points within the approximate distance and direction of the static infrastructure based on heading direction of the autonomous vehicle. In an embodiment, the heading direction of the autonomous vehicle is identified with respect to lidar view, based on elevation change of a first lidar ring from the autonomous vehicle. The plurality of lidar reflection reference points are marked and joined with a reference centre of the autonomous vehicle on an imaginary two-dimensional map. In an embodiment, the plurality of lidar reflection reference points are joined with the reference centre of the autonomous vehicle to form a polygon reference shape. In an embodiment, the plurality of lidar reflection reference points are identified by performing one or more searches by modifying range of predefined angles, in case no lidar reflection reference points are identified at the approximate distance and direction of the static infrastructure. For example, the plurality of lidar reflection reference points are searched at different predefined angles such as, "15°, 30°, 45°, 60°, 90° and the like with a positive or negative threshold value with respect to a perpendicular line with the orientation of the autonomous vehicle.

Further, the ECU 101 may detect position of the plurality of lidar reflection reference points from iteratively selected shift positions at the approximate distance and direction from the centroid coordinate on the pre-generated map within a predefined range and direction. In an embodiment, detection of the plurality of lidar reflection reference points comprises moving from the plurality of shift position with respect to the GPS centroid coordinate in the identified distance and direction on the pre-generated two-dimensional map to trace the polygon reference shape formed initially. Thereafter, the ECU 101 corrects the initial position of the autonomous vehicle by adding the centroid coordinate with one of the selected shift positions, to determine the initial position of the autonomous vehicle.

The ECU 101 may include at least one Central Processing Unit ("CPU" or "processor") 109 and a memory 107 for storing instructions executable by the at least one processor 109. The processor 109 may comprise at least one data processor for executing program components for executing user or system-generated requests. The memory 107 is communicatively coupled to the processor 109. The ECU 101 further comprises an Input/Output (I/O) interface 105. The I/O interface 105 is coupled with the processor 109 through which an input signal or/and an output signal is communicated.

Figure 2:
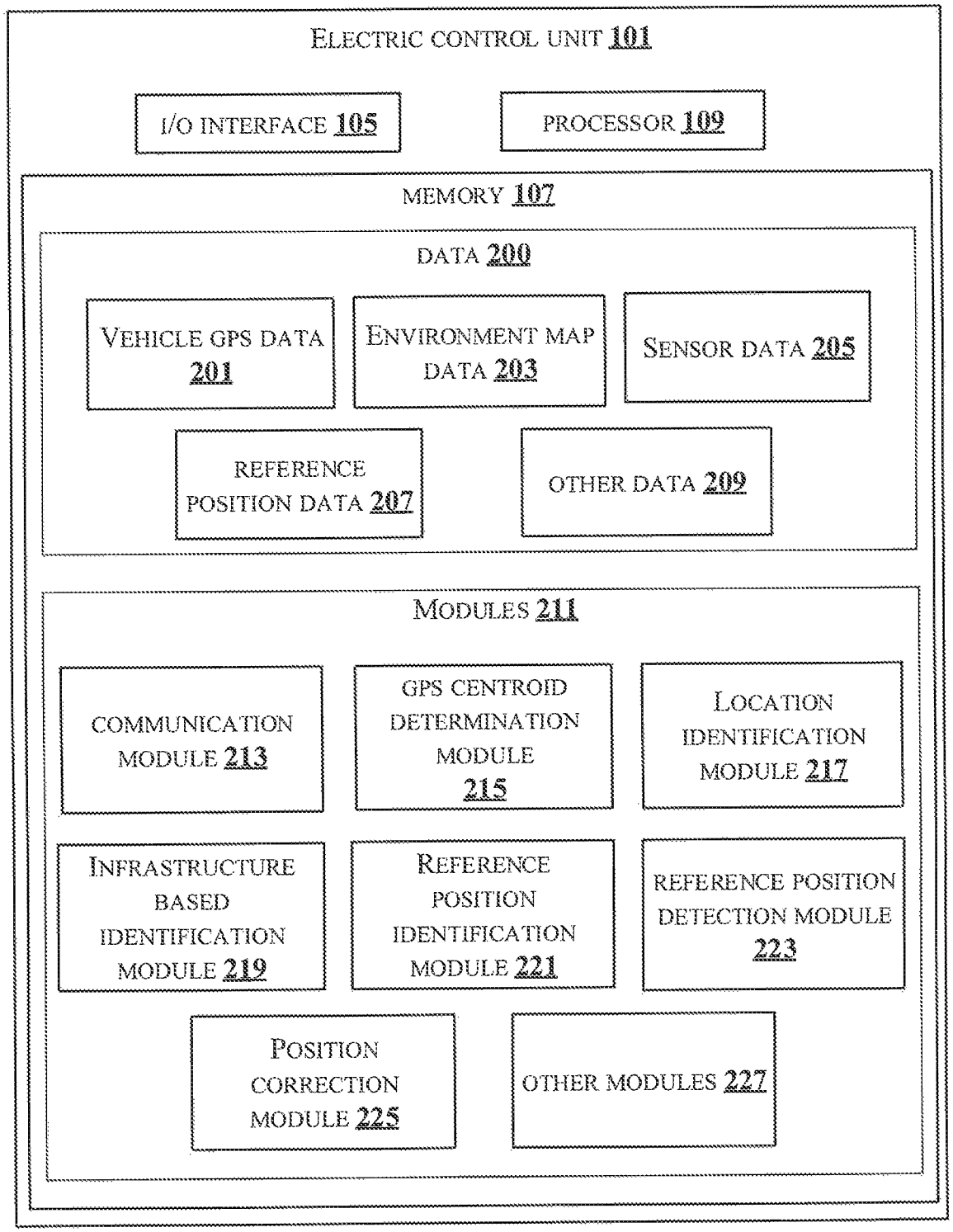
FIG. 2 illustrates embodiments of an Electronic Control Unit (ECU) configured for determining an accurate position of an autonomous vehicle in accordance with some embodiments of the present disclosure.

FIG. 2 illustrates an embodiment of the ECU 101 configured for determining an accurate position of an autonomous vehicle in accordance with some embodiments of the present disclosure.

The ECU 101 may include data 200 and one or more modules 211 which are described herein in detail. In an embodiment, data 200 may be stored within the memory 107. The data 200 may include, for example, vehicle GPS data 201, environment map data 203, sensor data 205, reference position data 207 and other data 209.

The vehicle GPS data 201 may include the plurality of Global Positioning System (GPS) points collected relative to the autonomous vehicle when he autonomous vehicle is powered ON and is at the stationary position. The plurality of GPS points is collected for the predefined time period.

The environment map data 203 may include details related to the pre-generated map of the environment. The pre-generated map is the two-dimensional environment map which correlates surrounding static infrastructure and covers a wide span of area around the autonomous vehicle. For example, the road boundaries surrounding the autonomous vehicle and the like.

The sensor data 205 may include data from the LIDAR sensor mounted on the autonomous vehicle. For example, the data from the LIDAR sensor includes a 360-degree view around the autonomous vehicle. Further, the sensor data 205 may include data from the IMU unit of the autonomous vehicle for determining vehicle heading direction. The sensor data 205 may include GPS sensors for detecting GPS coordinates of the autonomous vehicle. A person skilled in the art would understand that any other sensors not mentioned explicitly for the autonomous vehicle, may also be used in the present disclosure.

The reference position data 207 may include details regarding the plurality of lidar reflection reference points identified within the approximate distance and direction of the static infrastructure. For example, the details include coordinate information of the polygon reference shape formed by joining the plurality of lidar reflection reference points with the reference centre of the autonomous vehicle.

The other data 209 may store data, including temporary data and temporary files, generated by modules 211 for performing the various functions of the ECU 101.

In an embodiment, the data 200 in the memory 107 are processed by the one or more modules 211 present within the memory 107 of the ECU 101. In an embodiment, the one or more modules 211 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/ or other suitable components that provide the described functionality. In some implementations, the one or more modules 211 may be communicatively coupled to the processor 109 for performing one or more functions of the ECU 101. The said modules 211 when configured with the functionality defined in the present disclosure will result in a novel hardware.

In one implementation, the one or more modules 211 may include, but are not limited to, a communication module 213, a GPS centroid determination module 215, a location identification module 217, an infrastructure-based identification module 219, a reference position identification module 221, a reference position detection module 223 and a position correction module 225. The one or more modules 211 may also include other modules 227 to perform various miscellaneous functionalities of the ECU 101. In an embodiment, the other modules 227 may include a heading direction identification module for identifying the vehicle heading direction with respect to lidar view based on the elevation change of a first lidar ring from the autonomous vehicle.

The communication module 213 may he used for communication between the ECU 101 and other units (not shown in figures) of the autonomous vehicle. In an embodiment, the other units may comprise, but are not limited to, the sensors 103 etc. For example, the communication module 213 may receive the plurality of GPS points for the autonomous vehicle from the GPS sensor placed at the autonomous vehicle. Further, the communication module 213 may receive the data from the IMU unit of the autonomous vehicle for determining the heading direction. The communication module 213 may receive the data from the LIDAR sensor.

Figure 3A:
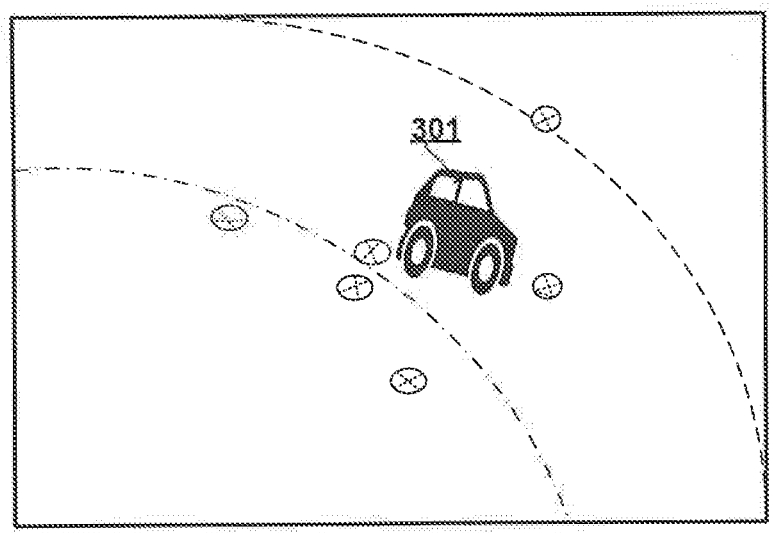
FIG. 3a-FIG. 3f show exemplary representations for determining a GPS centroid coordinate of the autonomous vehicle in accordance with some embodiments of the present disclosure.
Figure 3B:
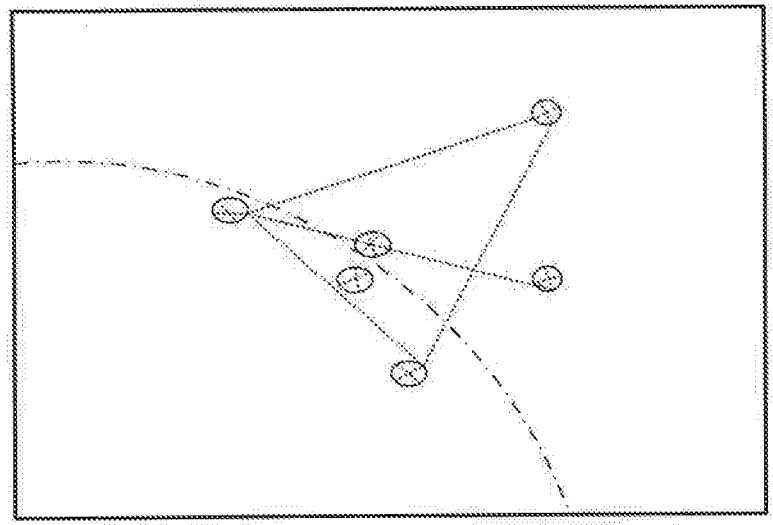
Figure 3C:
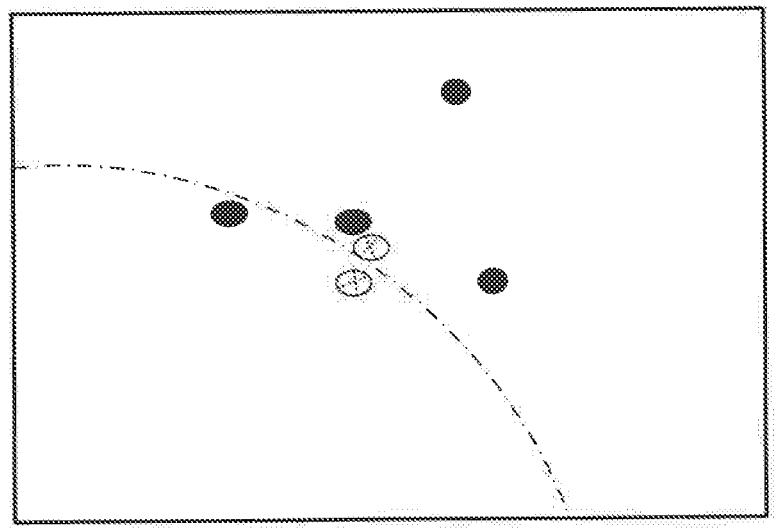
Figure 3D:
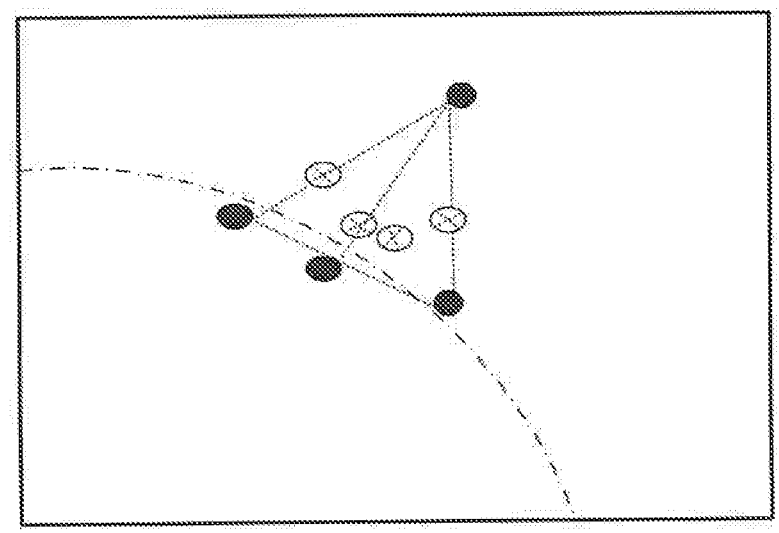
Figure 3E:
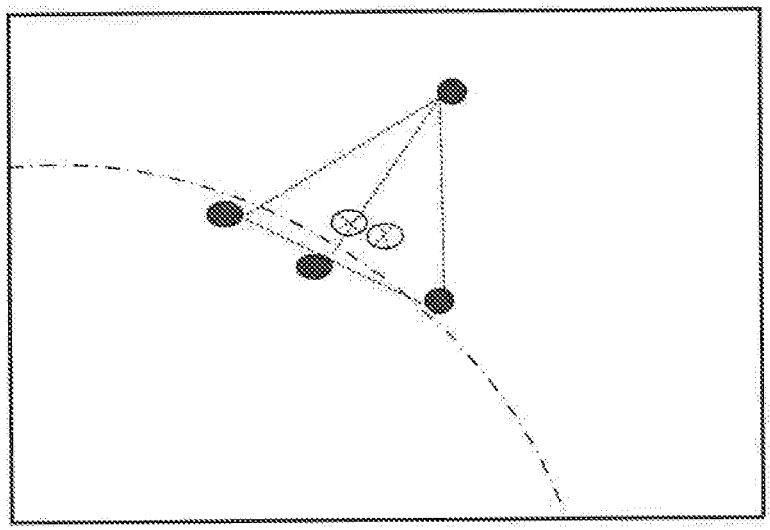
Figure 3F:
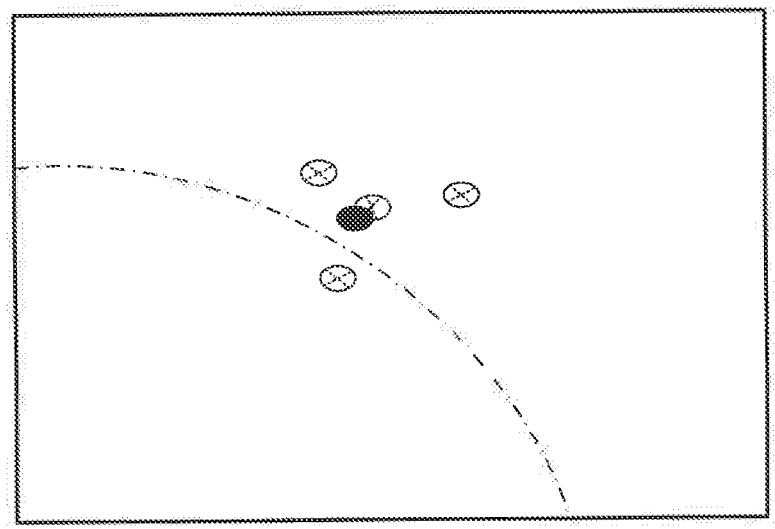

The GPS centroid determination module 215 may determine the GPS centroid coordinates from the plurality of Global Positioning System (GPS) points received relative to the autonomous vehicle at the stationary position. The plurality of GPS points is received at the predefined time period, for example, for one minute. FIG. 3a-FIG. 3f shows exemplary representations for determining a GPS centroid coordinate of the autonomous vehicle in accordance with some embodiments of the present disclosure. FIG. 3a shows an autonomous car 301 at stationary position. The GPS centroid determination module 215 of the autonomous car 301 receives six GPS points relative to the autonomous car 301 as shown in FIG. 3a. The GPS centroid determination module 215 connects highest distant GPS points with each other by imaginary straight line as shown in FIG. 3b and calculates one or more centre GPS points as shown in FIG. 3c. Further, the GPS centroid determination module 215 discards the GPS points connected with each other and keeps only the calculated centre points. The GPS centroid determination module 215 may iteratively perform the above steps until all the centre positions remaining out of the above step are within a threshold distance, as shown in FIG. 3d and FIG. 3e. In an embodiment, the threshold distance may be for example, an approximate range of five to ten centimetres. Once the centre position is within the threshold distance, the GPS centroid determination module 215 determines the centroid coordinate by randomly selecting one from final set of calculated centre points.

The location identification module 217 may identify the approximate location and orientation of the autonomous vehicle on the pre-generated map based on the centroid coordinate determined and data from the IMU sensor of the autonomous vehicle.

Figure 4:
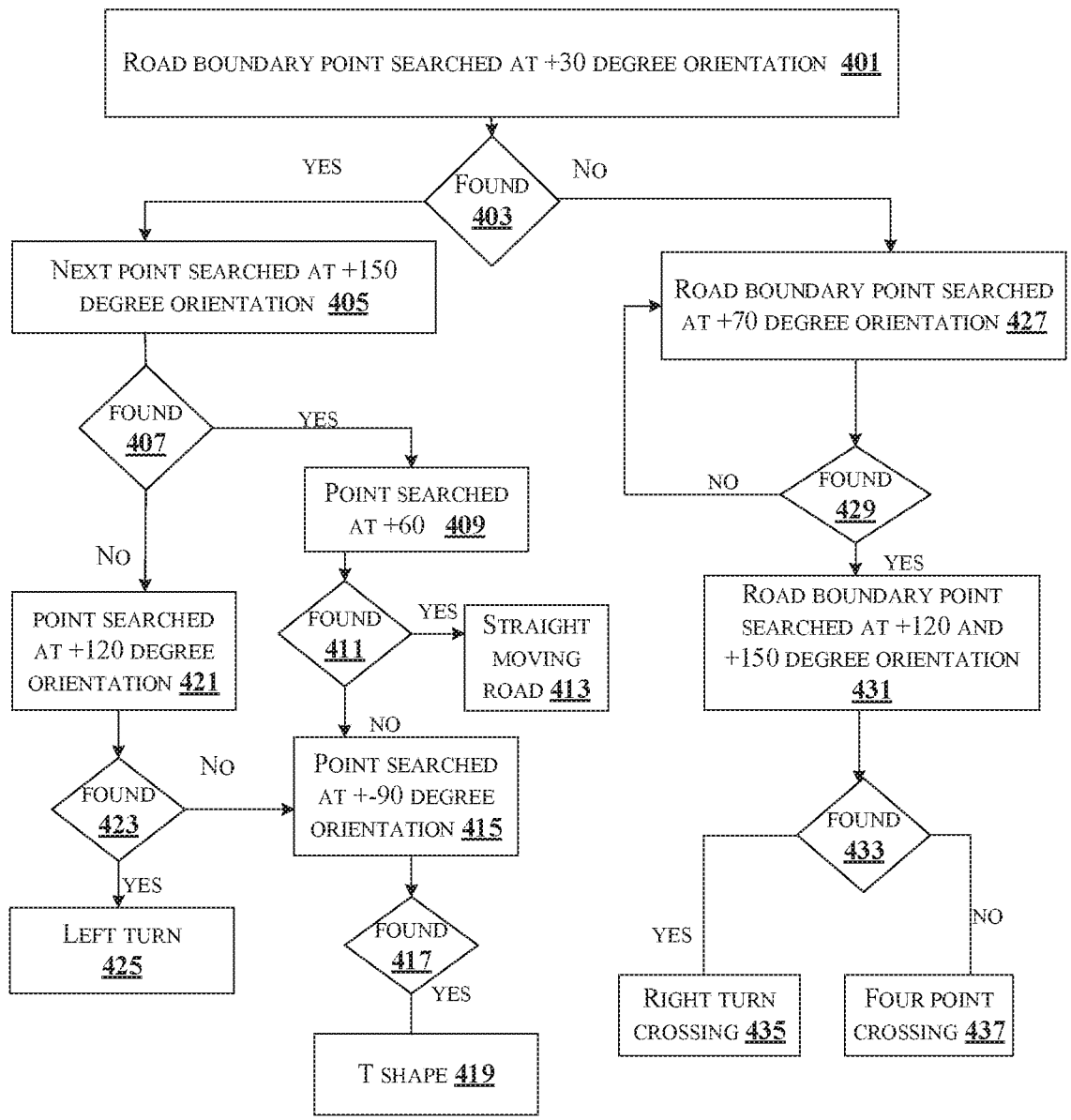
FIG. 4 shows a flowchart for analysing road boundaries in accordance with some embodiments of the present disclosure.

The infrastructure-based identification module 219 may identify the approximate distance and direction of surrounding static infrastructure from the approximate location and orientation of the autonomous vehicle. The infrastructure-based identification module 219 analysis the static infrastructure such as, road boundaries in the pre-generated map and data associated with objects adjacent to the autonomous vehicle. In an embodiment, the approximate distance may be identified based on a boundary selection in the pre-generated map is performed. FIG. 4 shows a flowchart for analysing road boundaries in accordance with some embodiments of the present disclosure. As shown in FIG. 4, the road boundary for the autonomous vehicle is identified.

At block 401, the infrastructure-based identification module 219 searches road boundary point at an angle of thirty-degree orientation.

At block 403, the infrastructure-based identification module 219 checks if the road boundary point is identified at the angle of thirty-degree orientation. In case of identification, the method moves to block 405. Alternatively, if the road boundary point is not identified at the angle of thirty-degree orientation, the method moves to block 427.

At block 405, the infrastructure-based identification module 219 searches the road boundary point at an angle of one hundred fifty-degree orientation.

At block 407, the infrastructure-based identification module 219 checks if the road boundary point is identified at the angle of one hundred fifty-degree orientation. In case of identification, the method moves to block 409. Alternatively, if the road boundary point is not identified at the angle of one hundred fifty-degree orientation, the method moves to block 421.

At block 409, the infrastructure-based identification module 219, searches the road boundary point at an angle of sixty-degree orientation.

At block 411, the infrastructure-based identification module 219 checks if the road boundary point is identified at the angle of one sixty-degree orientation. In case of identification, the method moves to block 413. Alternatively, if the road boundary point is not identified at the angle of one sixty-degree orientation, the method moves to block 415.

At block 413, the infrastructure-based identification module 219 identifies that the autonomous vehicle is at a straight moving road.

At block 415, the infrastructure-based identification module 219 searches the road boundary point at an angle of one ninety-degree orientation.

At block 417, the infrastructure-based identification module 219 checks if the road boundary point is identified at the angle of one ninety-degree orientation. In case of identification, the method moves to block 419.

At block 419, the infrastructure-based identification module 219 identifies that the autonomous vehicle is at a T shaped road boundary.

At block 421, the infrastructure-based identification module 219 searches the road boundary point at an angle of one hundred twenty-degree orientation.

At block 423, the infrastructure-based identification module 219 checks if the road boundary point is identified at the angle of one hundred twenty-degree orientation. In case of identification, the method moves to block 425. Alternatively, if the road boundary point is not identified at the angle of one hundred twenty-degree orientation, the method moves to block 415.

At block 425, the infrastructure-based identification module 219 identifies that the autonomous vehicle is at a left turn road boundary.

At block 427, the infrastructure-based identification module 219 searches the road boundary point at an angle of seventy-degree orientation.

At block 429, the infrastructure-based identification module 219 checks if the road boundary point is identified at the angle of seventy-degree orientation. In case of identification, the method moves to block 431. Alternatively, if the road boundary point is not identified at the angle of seventy-degree orientation, the method moves to block 427.

At block 431, the infrastructure-based identification module 219 searches the road boundary point at an angle of one hundred twenty-degree and one hundred fifty-degree orientation.

At block 433, the infrastructure-based identification module 219 checks if the road boundary point is identified at the angle of one hundred twenty-degree and one hundred fifty-degree orientation. In case of identification, the method moves to block 435. Alternatively, if the road boundary point is not identified, the method moves to block 437.

At block 435, the infrastructure-based identification module 219 identifies that the autonomous vehicle is at a right turn crossing.

At block 437, the infrastructure-based identification module 219 identifies that the autonomous vehicle is at a four-point crossing.

Returning back to FIG. 2, the road boundary around the autonomous vehicle may be represented for example, by a curved shaped boundary. In an embodiment, the static infrastructure beyond the identified road boundary may be provided with less priority. Length coverage for a curved shape road boundary may be represented as shown in equation 1 below.

$$L = D_{min} + C_{consts} * ((angle)^2 \% \ 90°) \quad (1)$$

Where $D_{min}$ =Road Width and $C_{const}$=0.3

The reference position identification module 221 may identify the plurality of lidar reflection reference points within the approximate distance and direction of the static infrastructure based on the heading direction of the autonomous vehicle. In an embodiment, the vehicle heading direction is identified with respect to lidar view based on elevation change of a first lidar ring from the autonomous vehicle. The reference position identification module 221 may join the plurality of lidar reflection reference points with the reference centre of the autonomous vehicle to form the polygon reference shape. The reference position identification module 221 marks and joins the plurality of lidar reflection reference points with the reference centre of the autonomous vehicle on the imaginary two-dimensional map. For example, consider the reference centre for the autonomous vehicle is at (0,0) in the imaginary 2D map. Further, based on the heading direction of the autonomous vehicle, the reference position identification module 221 identifies plurality of lidar reflection points. The reference position identification module 221 may choose any such lidar reflection points. In an embodiment, the reference position identification module 221 may ignore 'z' value of the point and may take 'x' and 'y' points and determine an imaginary line equation joining the point and the reference centre of the autonomous vehicle. Equations below shows modelling equation for the reference points.

$$y - y1/x - x1 = \tan(theta_A) \quad (2)$$

where x1 & y1 are both zero.

$$y - y2/x - x2 = \tan(theta_B) \quad (3)$$

where x2 & y2 are both zero.

$$y - y3/x - x3 = \tan(theta_C) \quad (4)$$

where x3 & y3 are both zero.

Figure 5A:
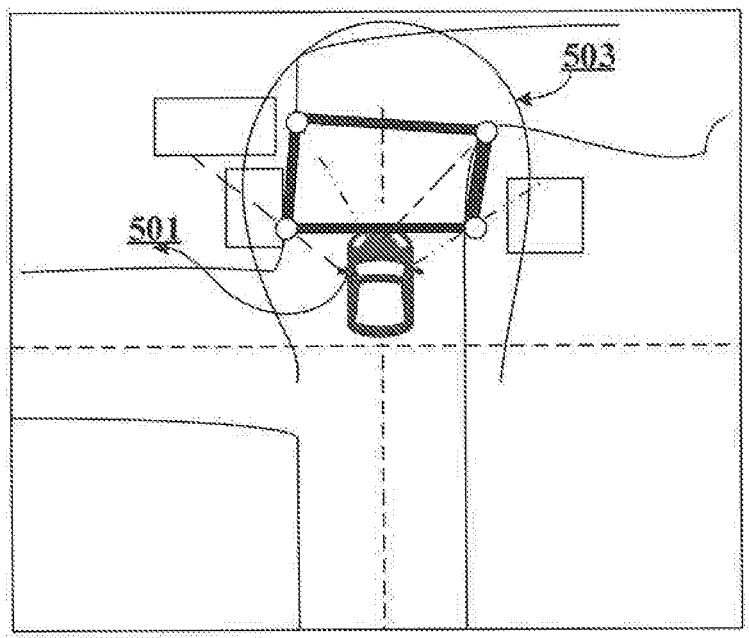
FIG. 5a-FIG. 5e shows few exemplary representations for identifying lidar reflection reference points in accordance with some embodiments of the present disclosure.
Figure 5B:
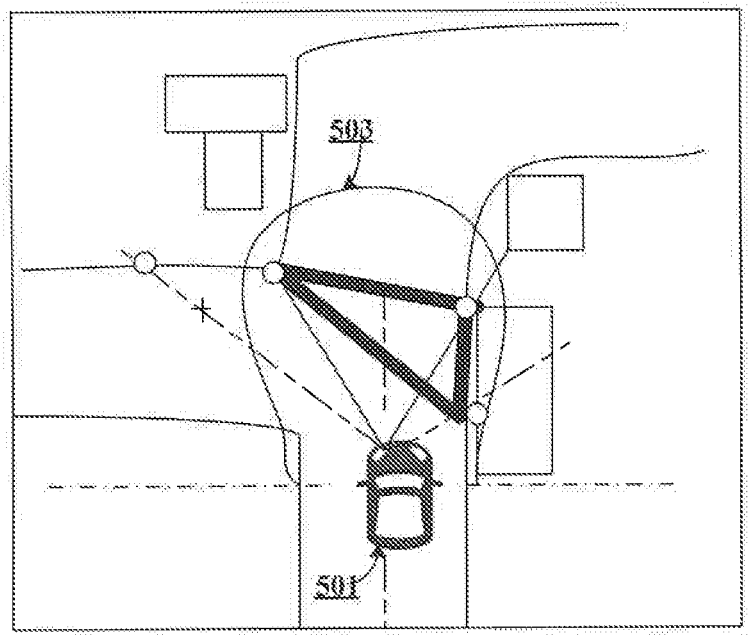
Figure 5C:
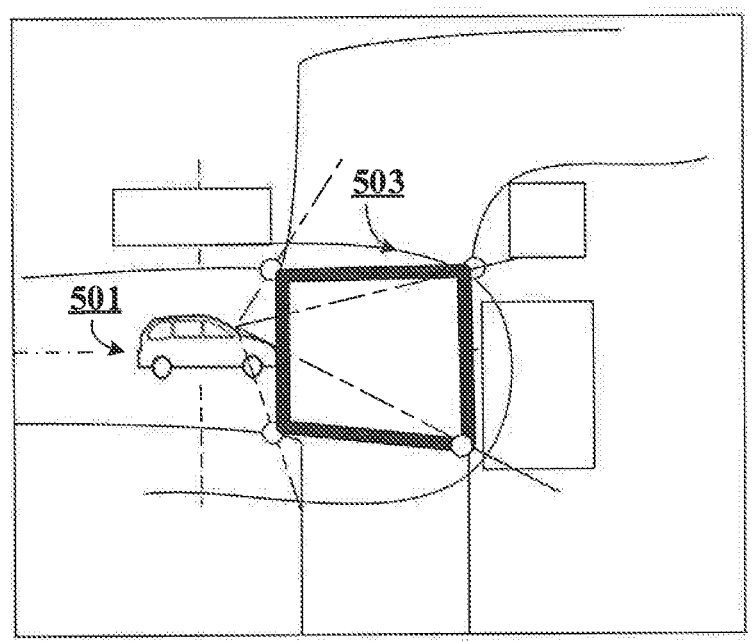
Figure 5D:
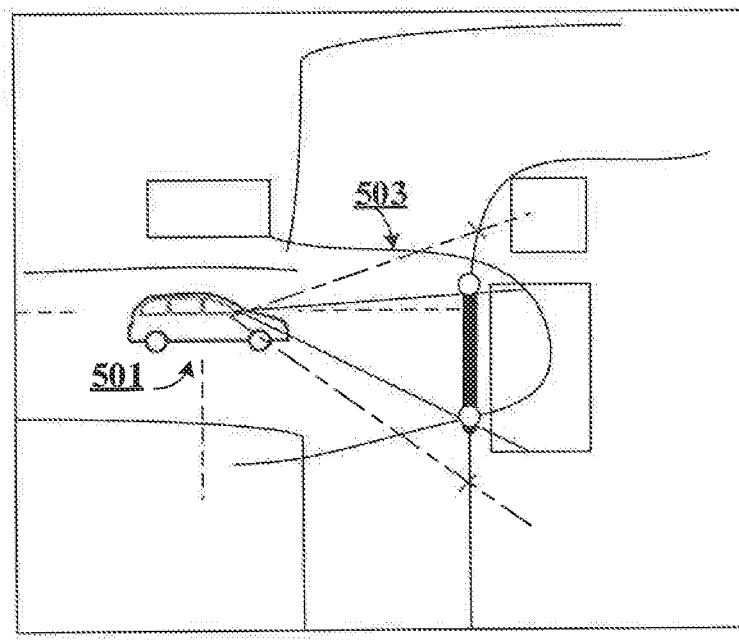
Figure 5E:
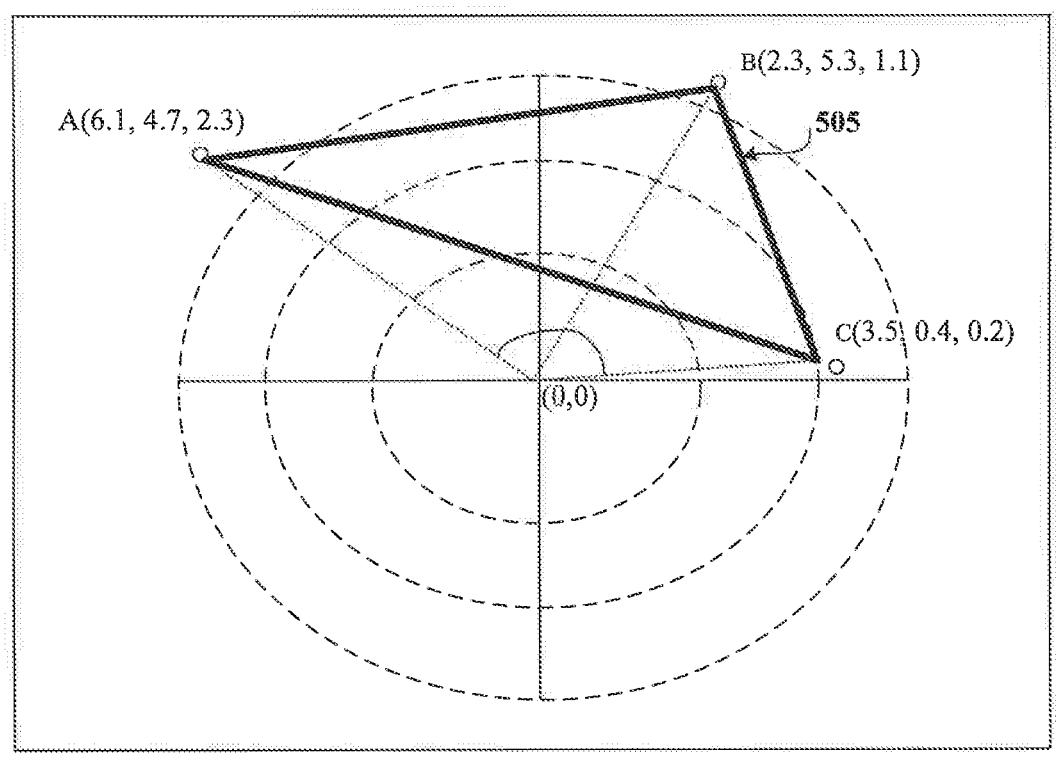

Further, in case no lidar reflection reference points are identified at the approximate distance and direction of the static infrastructure, the reference position identification module 221 performs one or more searches by modifying range of predefined angles, such as theta. In an embodiment, the equations (1) (2) and (3) may be resolved by using value of x and y based on the one or more searches. In an embodiment, three or more lidar reflection reference point may be identified and used as reference absolute value with respect to reference centre on the imaginary 2D map. FIG. 5a-FIG. 5e shows few exemplary representations for identifying lidar reflection reference points in accordance with some embodiments of the present disclosure. FIG. 5a-FIG. 5d shows an autonomous car 501 at stationary position. A curved road boundary 503 is identified for the autonomous car 501. In an embodiment, the plurality of lidar reflection reference points may be identified within the curved road boundary 503. As shown in FIG. 5a-FIG. 5d, based on intersection of the reflection reference points within the curved road boundary 503, a polygon shape is identified as at FIG. 5a-FIG. 5c. FIG. 5e shows an exemplary representation of a polygon shape determined on an imaginary two-dimensional map based on lidar reflection reference points. As shown in FIG. 5e, three reflection reference points, namely, point A, point B and point C are used to form a polygon shape 505.

Figure 6A:
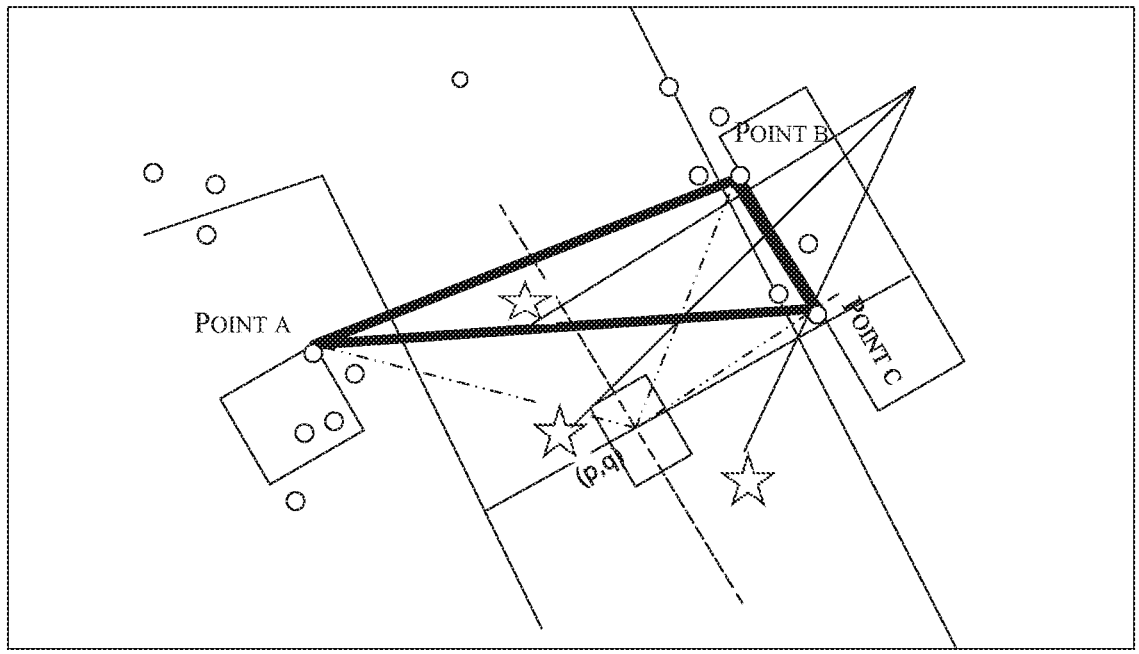
FIG. 6a-FIG. 6c show exemplary representations for detecting position of lidar reflection reference points in accordance with some embodiments of the present disclosure.
Figure 6B:
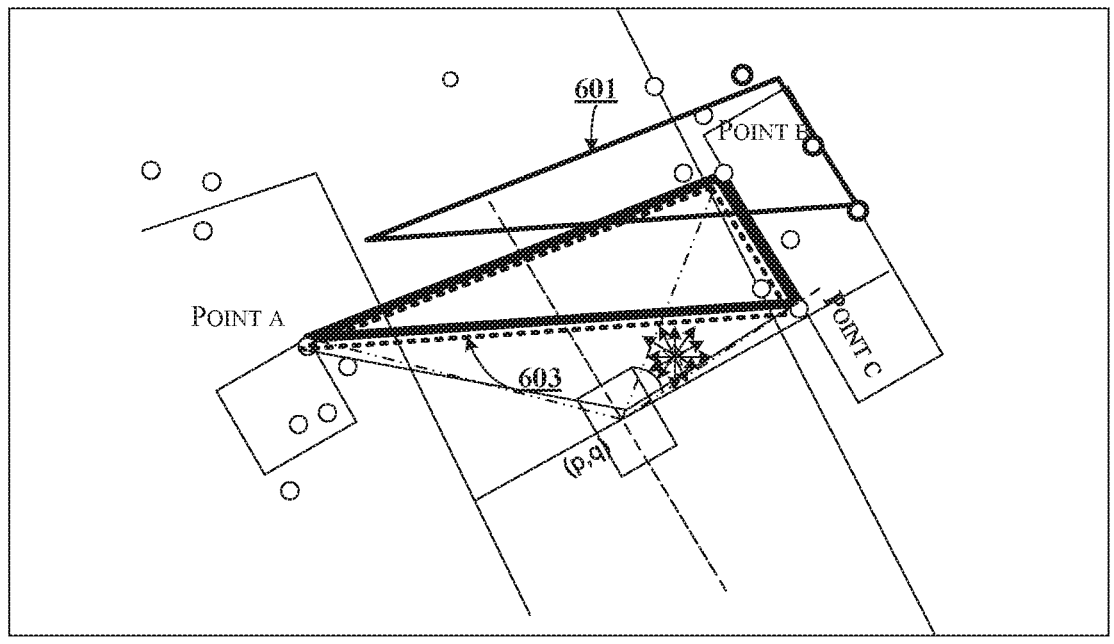
Figure 6C:
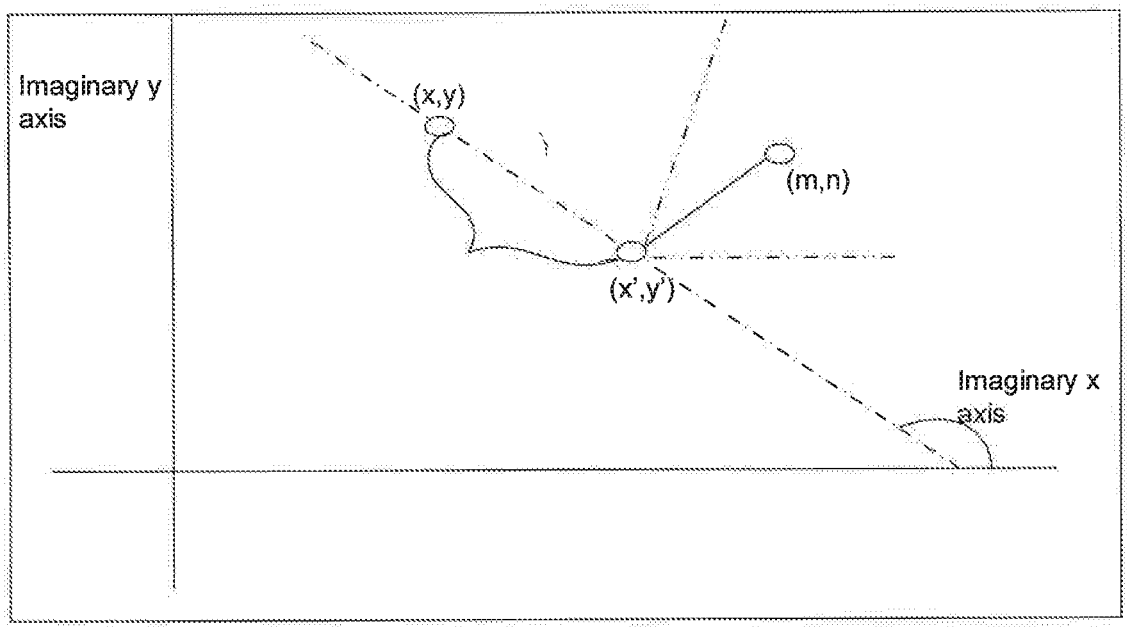

The reference position detection module 223 may detect the position of the plurality of lidar reflection reference points from iteratively selected shift positions at the approximate distance and direction from the centroid coordinate on the pre-generated map and within a predefined range and direction. FIG. 6a-FIG. 6c shows exemplary representation for detecting position of lidar reflection reference points in accordance with some embodiments of the present disclosure. In FIG. 6a, suppose a star representation as shown represent the centroid coordinate of GPS. Thus, the GPS location is close to the autonomous vehicle actual centre. Consider, the GPS centroid coordinate with respect to actual map of navigation is say (12423.23m, 45321.67m) in keratein coordinate. The reference position detection module 223 may consider the GPS centroid coordinate on imaginary map as (m, n) as shown in FIG. 5a with respect to reference (p, q). Thus, the reference position detection module 223 may move or swing the GPS centroid coordinate around and identify centre of the autonomous vehicle and measure deviation. The reference position detection module 223 may move the centroid point (m, n) the pre-generated map by maintaining a pattern of movement and direction up to a certain bound, for example, 3*2 to 4*2 meter within the predefined range and direction. Upon this movement, the reference position detection module 223 may search and detect the polygon shape formed based on the lidar reflection reference points. In FIG. 6b, swing lines are shown with black arrows at various direction, around the approximate GPS centroid. A triangle shape 601 is a representation of a search of lidar reflection reference point while swinging along one of the swing lines. Similarly, a triangle 603 represented with dotted lines is a representation which matches with the polygon shape formed based on the lidar reflection reference points. In an embodiment, orientation of swing lines is at 'θ' separation. Thus, a slope for swing lines may be, '0', 'θ', '2θ', '3θ', '4θ' and so on. Equation 5 below represents an equation for a swing line.

$$(y'-n)/(x'-m) = \tan(K*\theta) \quad (5)$$

where K is between 0 to 8 or 0 to 15
and, $y' = n + (x'-m)*\tan(K*\theta)$; or
$y' = n - m*\tan(K*\theta) + \tan(K*\theta)*x'$; or
$y' = n + B + C*x'$
where all m, n, K* θ is chosen and constant.

Now, by iteratively varying either x' or y' from a negative value to positive value at a chosen separation, a set of shifts points, y' or x' may be obtained and hence an (x', y') pair.
Thus, $x' = m' + (0.1 \text{ meter})*P$
where P=1,2,3 . . .

Further, from each iteratively shift point (x', y'), the reference position detection module 223 may traverse along a specified theta orientation to find the projected lidar reflection represent points on the imaginary 2D map as shown in FIG. 6c. Below equations represents for traversing.

$$y-y'/x-x' = \tan(theta_A) \quad (6)$$

$$y-y'/x-x' = \tan(theta_B) \quad (7)$$

$$y-y'/x-x' = \tan(theta_C) \quad (8)$$

Further, for example, if in equation (5), values of x (say X) around x' is varied to identify a value of y (say Y). Suppose, for a maximum two such X, Y if identified on the imaginary 2D map and mark at a distance of for example, $(\sqrt{(6.1^2+4.7^2)}$ as the distance of one of the lidar reflection reference point. In case, if at least one match is found, one of the lidar reflection reference point may be identified. Once equation (5) satisfy the condition, equation 6 and equation 7 may be used to identify the lidar reflection reference point at predefined distance, for example, at $(\sqrt{(2.3^2+5.2^2)}$ and $\sqrt{(3.5^2+0.4^2)}$ distance on $theta_B$ and $theta_C$ oriented line respectively. In case, if all lidar reflection reference points are identified on the pre-generated map, the shift point (x', y') may be considered as the centre of the autonomous vehicle, where the shift may be measured as (X', Y'), one particular value of (x', y').

The position correction module 225 may determine the accurate position of the autonomous vehicle by correcting the initial position of the autonomous vehicle. The position correction module 225 adds the centroid coordinate determined for the autonomous vehicle with one of the selected shift positions to arrive at the accurate position. For example, the position correction module 225 may add the shift point (X', Y') identified by the reference position detection module 223 with the centroid coordinate to determine the accurate position of the autonomous vehicle. Thus, the corrected initial position may be centroid coordinate (mx, my), where the coordinate "mx" is a combination of point "m" and shift point X' and "ny" is a combination of point "n" and shift point Y'.

Figure 7:
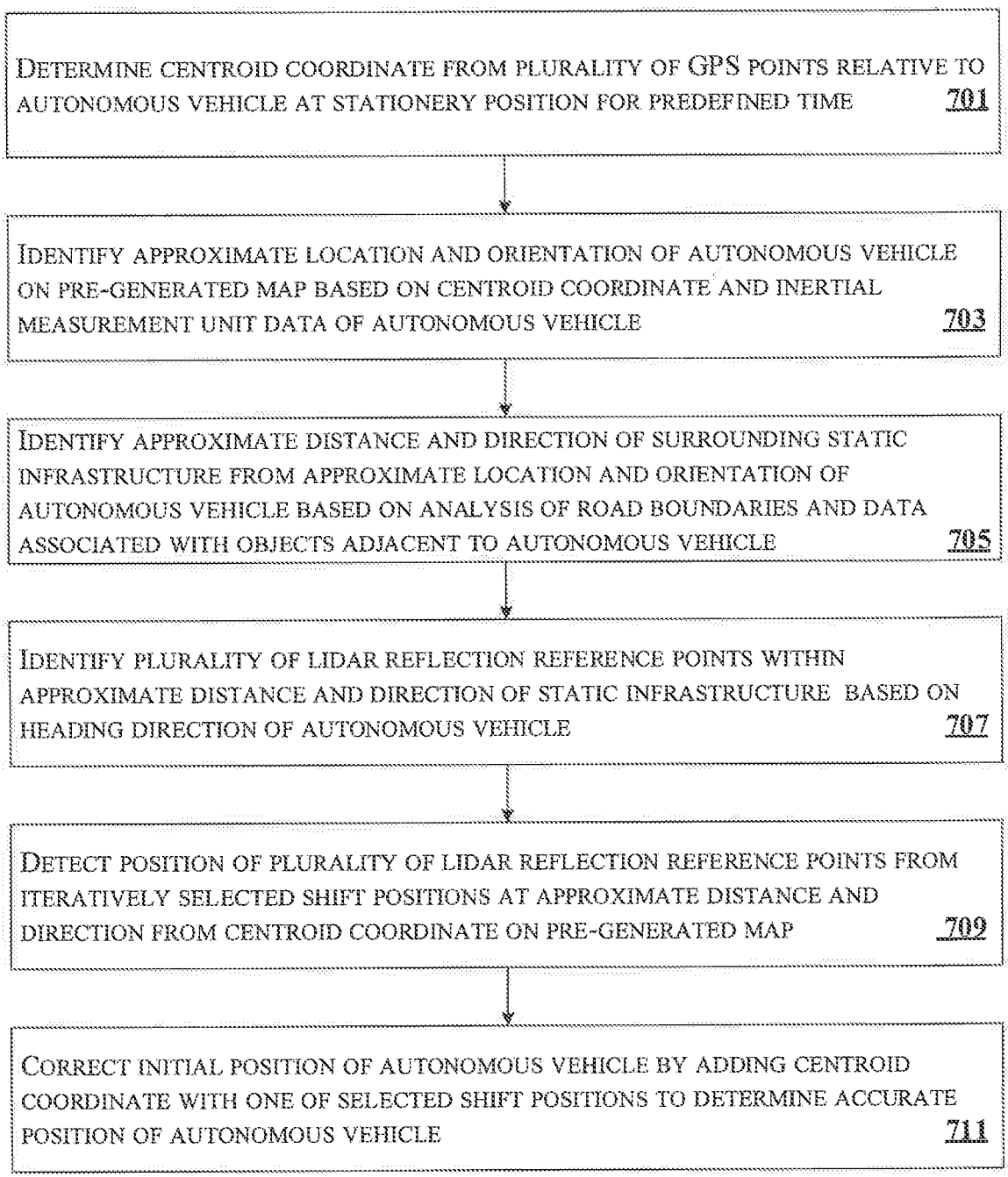
FIG. 7 illustrates a flowchart showing a method of determining an accurate position of an autonomous vehicle in accordance with some embodiments of present disclosure.

FIG. 7 illustrates a flowchart showing a method for determining an accurate position of an autonomous vehicle in accordance with some embodiments of present disclosure.

As illustrated in FIG. 7, the method 700 includes one or more blocks for determining an accurate position of an autonomous vehicle. The method 700 may be described in the general context of computer executable instructions. Generally, computer executable instructions can include routines, programs, objects, components, data structures, procedures, modules, and functions, which perform particular functions or implement particular abstract data types.

The order in which the method 700 is described is not intended to be construed as a limitation, and any number of the described method blocks can be combined in any order to implement the method. Additionally, individual blocks may be deleted from the methods without departing from the scope of the subject matter described herein. Furthermore, the method can he implemented in any suitable hardware, software, firmware, or combination thereof.

At block 701, the centroid coordinate from the plurality of Global Positioning System (GPS) points, relative to the autonomous vehicle is determined by the GPS centroid determination module 215 for the predefined time. The autonomous vehicle is at stationary position.

At block 703, the approximate location and orientation of the autonomous vehicle is identified by the location identification module 217 on the pre-generated map based on the centroid coordinate and Inertial Measurement Unit (IMU) data of the autonomous vehicle.

At block 705, the approximate distance and direction of surrounding static infrastructure from the approximate location and orientation of the autonomous vehicle is identified by the infrastructure-based identification module 219 based on the analysis of road boundaries in the pre-generated map and data associated with objects adjacent to the autonomous vehicle.

At block 707, the plurality of lidar reflection reference points is identified by the reference position identification module 221 within the approximate distance and direction of the static infrastructure based on heading direction of the autonomous vehicle. The plurality of lidar reflection reference points are marked and joined with the reference centre of the autonomous vehicle on the imaginary two-dimensional map.

At block 709, the position of the plurality of lidar reflection reference points is detected by the reference position detection module 223 from iteratively selected shift positions at the approximate distance and direction from the centroid coordinate on the pre-generated map within the predefined range and direction.

At block 711, the initial position of the autonomous vehicle is corrected by the position correction module 225 by adding the centroid coordinate with one of the selected shift positions to determine the accurate position of the autonomous vehicle.

An embodiment of the present disclosure determines accurate initial position of autonomous vehicle without any pre-arrangement of environment.

An embodiment of the present disclosure is effective in determining the accurate initiate position as no special infrastructure is required.

An embodiment of the present disclosure can be applied on areas with low GPS signal strength due to non-dependency on GPS reading.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERRAL NUMERALS: | |
|---|---|
| Reference number | Description |
| 100 | Autonomous navigation system |
| 101 | ECU |
| 103 | Sensors |
| 105 | I/O interface |
| 107 | Memory |
| 109 | Processor |
| 200 | Data |
| 201 | Vehicle GPS data |
| 203 | Environment map data |
| 205 | Sensor data |
| 207 | Reference position data |
| 209 | Other data |
| 211 | Modules |
| 213 | Communication module |
| 215 | GPS centroid determination module |
| 217 | Location identification module |
| 219 | Infrastructure-based identification module |
| 221 | Reference position identification module |
| 223 | Reference position detection module |
| 225 | Position correction module |
| 227 | Other modules |
| 301 | Autonomous car |
| 501 | Autonomous car |
| 601 | Triangle shape |
| 603 | Dotted triangle shape |

What is claimed is:

1. A method of determining an accurate position of an autonomous vehicle, the method comprising:

determining, by an Electronic Control Unit (ECU) of the autonomous vehicle, a centroid coordinate from a plurality of Global Positioning System (GPS) points, relative to the autonomous vehicle which is at a stationary position, wherein the plurality of GPS points are received from a GPS sensor of the autonomous vehicle, for a predefined time;

identifying, by the ECU, an approximate location and orientation of the vehicle on a pre-generated map based on the centroid coordinate and Inertial Measurement Unit (IMU) data of the autonomous vehicle, wherein the IMU data is received from an IMU sensor of the autonomous vehicle for determining of a heading direction of the autonomous vehicle;

identifying, by the ECU, an approximate distance and direction of surrounding static infrastructure from the approximate location and orientation of the autonomous vehicle, based on an analysis of road boundaries in the pre-generated map and data associated with objects adjacent to the autonomous vehicle;

identifying, by the ECU, a plurality of lidar reflection reference points within the approximate distance and direction of the static infrastructure, based on the heading direction of the autonomous vehicle, wherein the plurality of lidar reflection reference points are marked and joined a reference centre of the autonomous vehicle on an imaginary two-dimensional map;

detecting, by the ECU, position of the plurality of lidar reflection reference points from iteratively selected shift positions, at the approximate distance and direction from the centroid coordinate on the pre-generated map, within a predefined range and direction; and correcting, by the ECU, the initial position of the autonomous vehicle by adding the centroid coordinate with one of the selected shift positions, to determine the accurate position of the autonomous vehicle.

2. The method as claimed in claim 1, wherein determining the centroid coordinate from the plurality of Global Positioning System (GPS) points received from the GPS sensor comprises:
performing, by the ECU, until a set of GPS points from the plurality of GPS points, collected for the predefined time, are at a predefined threshold distance, the steps of
connecting, by the ECU, highest distant GPS points by each other by imaginary straight line and calculating one or more centre GPS points;
discarding, by the ECU, GPS points connecting with each other, and keeping the calculated centre points;
determining, by the ECU, the centroid coordinate by randomly selecting one of the sets of calculated centre points.

3. The method as claimed in claim 1 further comprising identifying vehicle heading direction with respect to lidar view based on elevation change of a first lidar ring from the autonomous vehicle.

4. The method as claimed in claim 1, wherein identifying the plurality of lidar reflection reference points comprises performing one or more searches by modifying range of predefined angles, in case no lidar reflection reference points are identified at the approximate distance and direction of the static infrastructure.

5. The method as claimed in claim 1, wherein the pre-generated map is a two-dimensional map.

6. The method as claimed in claim 1 further comprising joining the plurality of lidar reflection reference points with the reference centre of the autonomous vehicle to form a polygon reference shape.

7. The method as claimed in claim 1, wherein detecting the plurality of lidar reflection reference points comprises moving from the plurality of shift position with respect to the GPS centroid coordinate in the identified distance and direction on the imaginary two-dimensional map to trace a polygon reference shape.

8. An Electronic Control Unit (ECU) of an autonomous vehicle for determining an accurate position of the autonomous vehicle, comprising:
a processor; and
a memory communicatively coupled to the processor, wherein the memory stores processor instructions, which, on execution, causes the processor to:
determine, for the autonomous vehicle, a centroid coordinate from a plurality of Global Positioning System (GPS) points, relative to the autonomous vehicle which is at a stationary position, wherein the plurality of GPS points are received from a GPS sensor of the autonomous vehicle, for a predefined time;
identify an approximate location and orientation of the vehicle on a pre-generated map based on the centroid coordinate and Inertial Measurement Unit (IMU) data of the autonomous vehicle, wherein the IMU data is received from an IMU sensor of the autonomous vehicle for determining of a heading direction of the autonomous vehicle;
identify an approximate distance and direction of surrounding static infrastructure from the approximate location and orientation of the autonomous vehicle, based on an analysis of road boundaries in the pre-generated map and data associated with objects adjacent to the autonomous vehicle;
identify a plurality of lidar reflection reference points within the approximate distance and direction of the static infrastructure, based on the heading direction of the autonomous vehicle, wherein the plurality of lidar reflection reference points are marked and joined with a reference centre of the autonomous vehicle on an imaginary two-dimensional map;
detect position of the plurality of lidar reflection reference points from iteratively selected shift positions, at the approximate distance and direction from the centroid coordinate on the pre-generated map, within a predefined range and direction; and
correct initial position of the autonomous vehicle by adding the centroid coordinate with one of the selected shift positions, to determine the accurate position of the autonomous vehicle.

9. The ECU as claimed in claim 8, wherein the processor determines the centroid coordinate from the plurality of Global Positioning System (GPS) points received from the GPS sensor by:
performing, until a set of GPS points from the plurality of GPS points, collected for the predefined time, are at a predefined threshold distance, the steps of:
connecting highest distant GPS points by each other by imaginary straight line and calculating one or more centre GPS points;
discarding GPS points connecting with each other, and keeping the calculated centre points;
determining the centroid coordinate by randomly selecting one of the sets of calculated centre points.

10. The ECU as claimed in claim 8, wherein the processor identifies the vehicle heading direction with respect to lidar view based on elevation change of a first lidar ring from the autonomous vehicle.

11. The ECU as claimed in claim 8, wherein the processor identifies the plurality of lidar reflection reference points by performing one or more searches by modifying range of predefined angles, in case no lidar reflection reference points are identified at the approximate distance and direction of the static infrastructure.

12. The ECU as claimed in claim 8, wherein the pre-generated map is a two-dimensional map.

13. The ECU as claimed in claim 8 wherein the processor joins the plurality of lidar reflection reference points with the reference centre of the autonomous vehicle to form a polygon reference shape.

14. The ECU as claimed in claim 8, wherein the processor detects the plurality of lidar reflection reference points by moving from the plurality of shift position with respect to the GPS centroid coordinate in the identified distance and direction on the imaginary two-dimensional map to trace a polygon reference shape.

* * * * *